(12) United States Patent
French et al.

(10) Patent No.: US 7,809,975 B2
(45) Date of Patent: Oct. 5, 2010

(54) RECOVERING FROM A STORAGE PROCESSOR FAILURE USING WRITE CACHE PRESERVATION

(75) Inventors: David French, Grafton, MA (US);
Douglas Sullivan, Hopkinton, MA (US);
William Buckley, Brighton, MA (US);
Alex Sanville, Boxborough, MA (US);
Phillip J. Manning, East Geenwich, RI (US)

(73) Assignee: EMC Corporation, Hopkinton, MA (US)

( * ) Notice: Subject to any disclaimer, the term of this patent is extended or adjusted under 35 U.S.C. 154(b) by 846 days.

(21) Appl. No.: 11/729,728

(22) Filed: Mar. 29, 2007

(65) Prior Publication Data

US 2008/0082856 A1    Apr. 3, 2008

Related U.S. Application Data

(63) Continuation-in-part of application No. 11/529,124, filed on Sep. 28, 2006.

(51) Int. Cl.
*G06F 11/00* (2006.01)
(52) U.S. Cl. ........................................... 714/3
(58) Field of Classification Search ............... 714/2–10, 714/13, 15, 16, 20, 21, 42, 54
See application file for complete search history.

(56) References Cited

U.S. PATENT DOCUMENTS

| | | | |
|---|---|---|---|
| 6,574,753 B1 * | 6/2003 | Haynes et al. ................. 714/43 |
| 6,629,211 B2 | 9/2003 | McKnight et al. | |
| 6,671,705 B1 * | 12/2003 | Duprey et al. ........................ 1/1 |
| 6,842,829 B1 | 1/2005 | Nichols et al. | |
| 7,062,675 B1 | 6/2006 | Kemeny et al. | |
| 7,231,497 B2 | 6/2007 | Trika et al. | |
| 7,441,081 B2 * | 10/2008 | Humlicek .................... 711/113 |
| 7,558,981 B2 * | 7/2009 | Ashmore et al. ............... 714/6 |
| 2003/0065841 A1 | 4/2003 | Pecone | |
| 2004/0117579 A1 * | 6/2004 | Wu et al. ..................... 711/170 |
| 2004/0117580 A1 * | 6/2004 | Wu et al. ..................... 711/170 |
| 2006/0004973 A1 * | 1/2006 | Sardella et al. ............. 711/162 |
| 2006/0107005 A1 * | 5/2006 | Philippe Andre et al. ..... 711/162 |
| 2006/0143407 A1 * | 6/2006 | Humlicek .................... 711/143 |
| 2007/0088975 A1 * | 4/2007 | Ashmore et al. ............... 714/6 |

FOREIGN PATENT DOCUMENTS

| EP | 0817054 A2 | 1/1998 |
|---|---|---|
| EP | 0889409 A1 | 1/1999 |

* cited by examiner

*Primary Examiner*—Nadeem Iqbal
(74) *Attorney, Agent, or Firm*—BainwoodHuang

(57) ABSTRACT

A computerized system includes two storage processors having respective local write caches configured to mirror each other. When a first storage processor becomes unavailable and mirroring of the local write caches is prevented, the computerized system continues to attend to write operations from an external host in a write-back manner by caching write data from the write operations in the local write cache of the second storage processor. In response to a failure of the second storage processor, the computerized system preserves the write data within the local write cache of the second storage processor. Then, upon recovery of the second storage processor from the failure, the computerized system continues to attend to further write operations from the external host in the write-back manner by caching additional write data in the local write cache of the second storage processor while the first storage processor remains unavailable.

27 Claims, 5 Drawing Sheets

RECOVERING FROM A STORAGE PROCESSOR FAILURE USING WRITE CACHE PRESERVATION

CROSS REFERENCE TO RELATED APPLICATIONS

This patent application is a Continuation-in-Part of U.S. patent application Ser. No. 11/529,124 filed on Sep. 28, 2006, entitled, "RESPONDING TO A STORAGE PROCESSOR FAILURE WITH CONTINUED WRITE CACHING", the contents and teachings of which are hereby incorporated by reference in their entirety.

BACKGROUND

One conventional data storage system includes two storage processors and a set of disk drives. Each storage processor has volatile semiconductor memory which, among other things, contains a local write cache. In the traditional sense, each storage processor further includes a set of microprocessors (e.g., dual microprocessors) which runs an operating system, as well as standard boot/reset subsystems such as a basic input/output system (BIOS) and a power-on self-test (POST) mechanism.

During initial power-up of the data storage system, the BIOS and the POST of each storage processor write to the volatile semiconductor memory of that storage processor. In particular, the BIOS initializes all of the memory regions and sets ups the initial error correction codes (ECCs) for the memory regions. Next, the POST utilizes a portion of the volatile semiconductor memory to carry out a series of tests, discoveries, other initializations, loads, etc.

Once the BIOS and POST have completed operation, the two storage processors run their respective operating systems to perform data storage operations on behalf of one or more external host computers. Along these lines, the two storage processors operate in an active-active manner to store data into, and retrieve data from, the set of disk drives on behalf of the external host computers. During such operation, the storage processors mirror the contents of their local write caches thus enabling the data storage system to achieve high availability of the host write data and thus safely acknowledge host write operations once the host write data reaches both write caches (i.e., a conventional write-back caching scheme).

If one storage processor of the data storage system suffers a non-recoverable failure (i.e., a failure that can only be resolved by servicing from a technician), the other storage processor may be able to continue to perform data storage operations so that the data storage system as a whole remains in operation. Specifically, when one storage processor fails, the remaining storage processor vaults the contents of its local write cache to one or more disk drives and then turns off its local write cache. From that point forward, the remaining storage processor carries out host write operations in a write-through manner in which the remaining storage processor acknowledges completion of the host write operations only after the write data is synchronized with the vault (if necessary) and stored on the set of disk drives.

In the above-described conventional data storage system, it should be understood that there may be situations in which the remaining storage processor encounters a failure (i.e., a second failure of the data storage system) from which it can recover. For instance, the remaining storage processor may suffer a software failure or a minor hardware failure which nevertheless enables the remaining storage processor to continuing to operate after re-initialization. In these situations, the remaining storage processor reboots itself by re-running the BIOS and POST. That is, the BIOS re-initializes all of the memory regions of the remaining storage processor's volatile semiconductor memory and provides new ECCs for these memory regions. Next, the POST utilizes the volatile semiconductor memory to re-perform the series of tests, discoveries, other initializations, loads, etc. Once the re-initialization process of the remaining storage processor is complete, the re-initialized storage processor can continue to perform data storage operations in the write-through manner (i.e., host write operations are acknowledged once the host write data is stored on the set of disk drives) until a technician arrives to repair the data storage system.

SUMMARY

Unfortunately, there are drawbacks to the above-described conventional data storage system. For example, when one storage processor fails, the remaining storage processor transitions from a write-back caching scheme to a write-through caching scheme in order to provide absolute fault tolerance while the data storage system continues operating on only one storage processor. Accordingly, once the first storage processor fails, the conventional data storage system is doomed to providing slower, and perhaps unacceptable, performance which is associated with write-through caching.

Moreover, when the conventional data storage system transitions to write-through caching, there may be a significant period of time in which the data storage system does not respond to host requests. During this period, the remaining storage processor of the data storage system is busy vaulting host write data.

Furthermore, if the remaining storage processor of the conventional data storage system does not carry out write-through caching once the first storage processor fails but instead attempts to continue write-back caching of host write data in its local write cache, any failure of the remaining storage processor will cause all of the host write data within the local write cache to be lost. For instance, suppose that the remaining storage processor continues write-back caching and encounters a software error (e.g., an operating system crash) resulting in an automatic reboot of the remaining storage processor. Since the BIOS and the POST overwrite the volatile semiconductor memory without limitation, the BIOS and the POST will corrupt the local write cache and the host write data will be lost.

One will appreciate that, statistically, the odds of the conventional data storage system initially suffering a non-recoverable failure in one storage processor, followed by a failure of the remaining storage processor are extremely low. Moreover, the odds of the conventional data storage system initially suffering a non-recoverable failure in one storage processor, followed by a major failure of the remaining storage processor (e.g., a substantial hardware failure from which the remaining storage processor cannot recover) are even lower, i.e., astronomically low. Accordingly, for many system installations, it may be deemed unnecessary and quite excessive for the remaining storage processor to incur the performance penalty of write-through caching for absolute fault tolerance, particularly if there is a way to preserve the contents of the local write cache during a minor failure of the remaining storage processor.

That is, the faster performance of write-back caching by the remaining storage processor may be desirable or even preferable, and worth the risk of the remaining storage processor encountering a substantial hardware failure (or software failure which corrupts the write cache) from which it could not recover. Techniques and advantages of responding to a storage processor failure with continued write caching are described in earlier-referenced U.S. application Ser. No. 11/529,124.

In contrast to the above-described conventional data storage system in which a remaining storage processor carries out write-through caching once a first storage processor fails, improved techniques involve preserving write data in a local write cache in response to a failure of a second storage processor. With this ability to preserve write data in a local write cache, the second storage processor is capable of (i) carrying out a write-back caching scheme after the loss of a first storage processor and (ii) recovering from a second storage processor failure without losing any write data. As a result, the second storage processor enjoys write-back caching performance. Moreover, the statistical odds of the second storage processor succumbing to a significant failure from which it cannot recover from (i.e., a failure in which the write data in its local write cache would be truly lost) are astronomically low and thus offer an acceptable risk in many situations.

In accordance with an embodiment of the invention, a computerized system includes multiple processing modules, i.e., a data storage system having two storage processors having respective local write caches configured to mirror each other. When a first storage processor becomes unavailable and mirroring of the local write caches is prevented, the computerized system continues to attend to write operations from an external host in a write-back manner by caching write data from the write operations in the local write cache of the second storage processor. In response to a failure of the second storage processor, the computerized system preserves the write data within the local write cache of the second storage processor. Then, upon recovery of the second storage processor from the failure, the computerized system continues to attend to further write operations from the external host in the write-back manner by caching additional write data in the local write cache of the second storage processor while the first storage processor remains unavailable. Thus, the computerized system as a whole continues to enjoy write-back caching and its associated faster performance over write-through even after failure of the first storage processor.

In accordance with another embodiment of the invention, a processing device includes a communications interface constructed and arranged to communicate with a set of storage devices, and random access memory constructed and arranged to cache data en route to the set of storage devices. The processing device further includes control circuitry coupled to the communications interface and to the random access memory. The control circuitry is constructed and arranged to preserve the data in the random access memory while reinitializing other storage processor components including the communications interface and the control circuitry in response to a failure. In the context of this embodiment, a computerized system persists memory through a reset (e.g., a reset of an entire circuit board except for the memory subsystem). Accordingly, data within the memory is preserved while other parts of the system (e.g., processor(s), interface devices, ancillary components, etc.) enjoy re-initialization.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Improved techniques involve preserving write data in a local write cache in response to a failure of a second storage processor of a data storage system having two storage processors. With this ability to preserve write data in a local write cache, the second storage processor is capable of (i) carrying out a write-back caching scheme after the loss of a first storage processor and (ii) recovering from a second storage processor failure without losing any write data. As a result, the second storage processor enjoys write-back caching performance even after recovery of the second storage processor. Moreover, the statistical odds of the second storage processor succumbing to a failure that it cannot recover from (i.e., in which the write data in its local write cache would be truly lost) are astronomically low and thus offer an acceptable risk in many situations.

Figure 1:
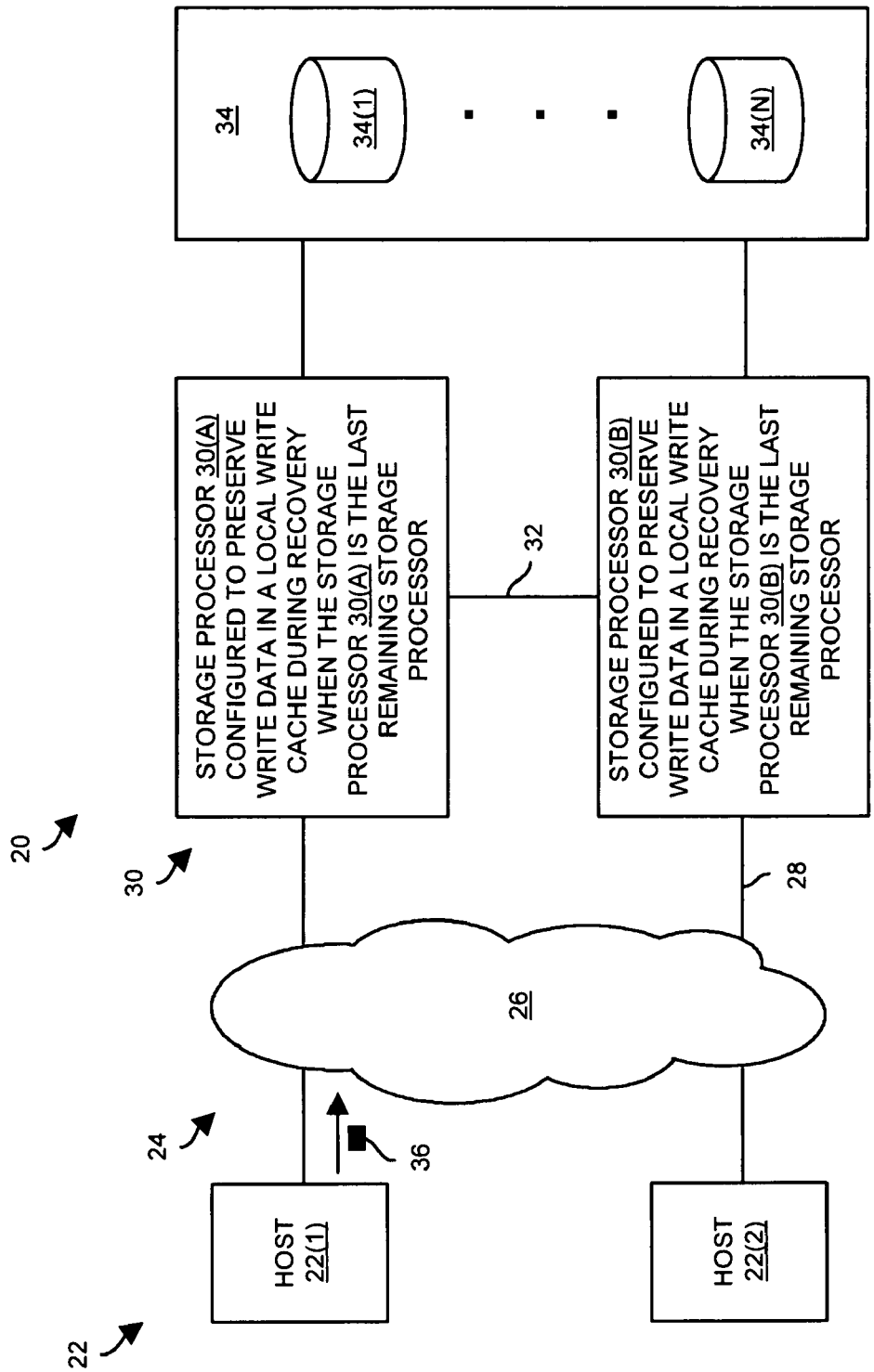
FIG. 1 is a block diagram of a computerized system having multiple storage processors which are constructed and arranged to preserve write data in respective local write caches in response to a failure of the last remaining storage processor.

FIG. 1 is a block diagram of a data storage system 20 which is constructed and arranged to store and retrieve data on behalf of a set of external host computers 22(1), 22(2), . . . (collectively, external hosts 22) via a communications medium 24 (e.g., copper wire, fiber optic cable, wireless medium, related data communications devices, combinations thereof, etc.) which is shown generally by a network cloud 26 and connecting lines 28.

The data storage system 20 includes multiple storage processors 30(A), 30(B) (collectively, storage processors 30), a cache mirroring interface 32, and a set of disk drives 34(1), . . . 34(N) (collectively, disk drives 34). The cache mirroring interface 32 (e.g., a specialized bus) enables the storage processors 30 to mirror cached write data which is temporarily stored in volatile semiconductor memory. Accordingly, the data storage system 20 achieves a degree of high availability (i.e., the cached write data is stored in multiple locations) while the data storage system 20 operates under a write-back caching scheme. The set of disk drives 34 ultimately provides fault tolerant, non-volatile storage (e.g., using a RAID scheme).

During operation, the storage processors 30 carry out data storage operations 36 on behalf of the external hosts 22 in an active-active manner (i.e., concurrent and independent processing) thus providing load balancing capabilities in addition to high availability. Accordingly, the data storage system 20 is able to provide more throughput than a system having a single processing module, or a system having only one operating processing module accompanied by a backup or hot standby processing module.

In connection with write operations, if one of the storage processors 30 of the data storage system 20 fails (e.g., the storage processor 30(A)), the remaining storage processor 30 (e.g., the storage processor 30(B)) is capable of continuing to operate under a write-back caching scheme with a degree of memory-related high availability. To this end, each storage processor 30 is constructed and arranged to preserve its local write cache when it is the last remaining operating storage processor 30 and when it encounters a failure that it can successfully recover from (e.g., a software failure, a minor hardware failure, etc.). In particular, if the storage processor 30 needs to reset during such a situation, the storage processor 30 has the ability to first protect the write data stored in its local write cache prior to resetting. As a result, no data is lost during the recovery process and the storage processor 30 is capable of enjoying write-back caching both before and after the failure.

Moreover, the odds of the last remaining storage processor 30 suffering a significant failure from which it cannot recover from are astronomically low. Accordingly, for many applications, the continuous write-back caching operation of the data storage system 20 is advantageous and preferred. A summary of how the data storage system 20 maintains write-back caching during multiple failures will now be provided with reference to FIG. 2.

Figure 2:
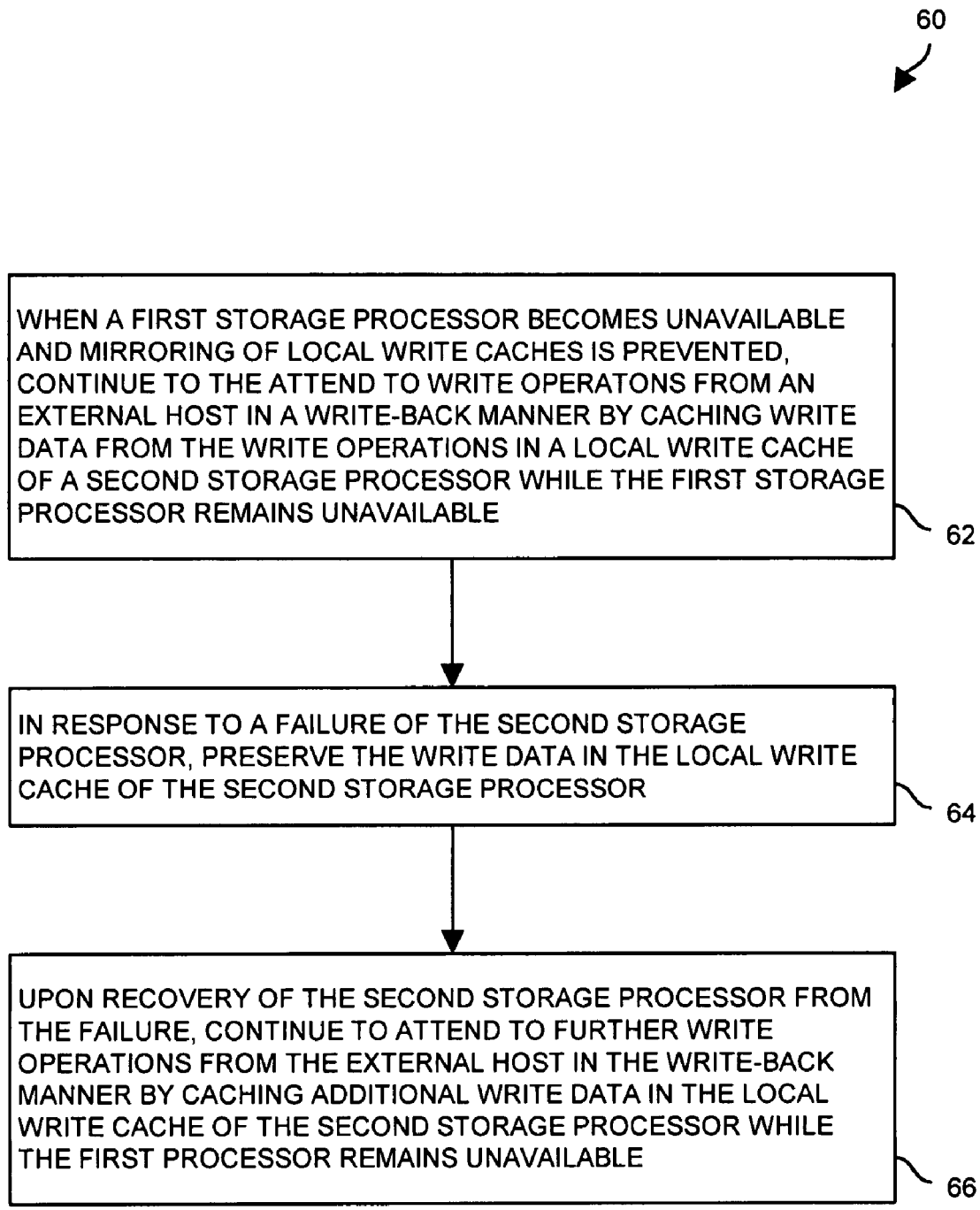
FIG. 2 is a flowchart of a procedure which is performed by the computerized system of FIG. 1.

FIG. 2 is a flowchart of a procedure 60 which is performed by the data storage system 20 when encountering multiple storage processor failures. Suppose that the data storage system 20 has just been turned on from a powered-down state. Prior to step 62, the multiple storage processors 30 power up and begin operating in an active-active manner (i.e., each storage processor 30 performs data storage operations on behalf of one or more external hosts 22, also see FIG. 1). Then, at some point, suppose that the storage processor 30(A) fails in a non-recoverable manner. Such a situation can result if the storage processor 30(A) suffers a severe hardware failure (e.g., a circuit board short) which takes the storage processor 30(A) out of operation and prevents local write cache mirroring. Such a situation can also result from a failure of the cache mirroring interface 32, i.e., if the storage processors 30 are unable to mirror their write data through the cache mirroring interface 32, one of the storage processors 30 (i.e., the storage processor 30(A)) disables itself to avoid data synchronization issues.

Step 62 describes the situation after failure of the storage processor 30(A) and local write cache mirroring is prevented. Here, the data storage system 20 continues to operate using the remaining storage processor 30(B). In particular, the storage processor 30(B) continues to attend to write operations in a write-back manner by caching write data from the write operations in its local write cache. As a result, write operations from the external hosts 22 (also see the data storage operations 36 in FIG. 1) enjoy fast response times relative to a write-through caching scheme. Step 62 then proceeds to step 64.

Suppose now that the storage processor 30(B) suffers a recoverable failure, i.e., a second failure of the data storage system 20. In step 64, in response to this failure, the data storage system 20 preserves the write data within its local write cache. In one arrangement, the storage processor 30(B) persists the write data in its volatile semiconductor memory while the circuit board processing circuitry resets (this feature will be described in further detail shortly with reference to FIGS. 3-5). In another arrangement, the storage processor 30(B) temporarily moves the write data from its volatile semiconductor memory to flash memory before resetting, and then from the flash memory back to its volatile semiconductor memory after resetting. In yet another arrangement, the storage processor 30(B) temporarily moves the write data from its volatile semiconductor memory to disk memory (e.g., one or more of the disk drives 34, see FIG. 1) before resetting, and then from the disk memory back to its volatile semiconductor memory after resetting. Step 64 then proceeds to step 66.

In step 66, upon recovery of the storage processor 30(B) from the failure (i.e., after reloading of the operating system), the data storage system 20 resumes operation. That is, the storage processor 30(B) continues attending to further write operations in the write-back manner by caching additional write data in the local write cache of the storage processor 30(B) while the storage processor 30(A) remains unavailable. Thus, the data storage system 20 as a whole continues to enjoy write-back caching and its associated faster performance rather than relent to write-through caching even after the data storage system 20 has suffered multiple storage processor failures. Further details will now be provided with reference to FIG. 3.

Figure 3:
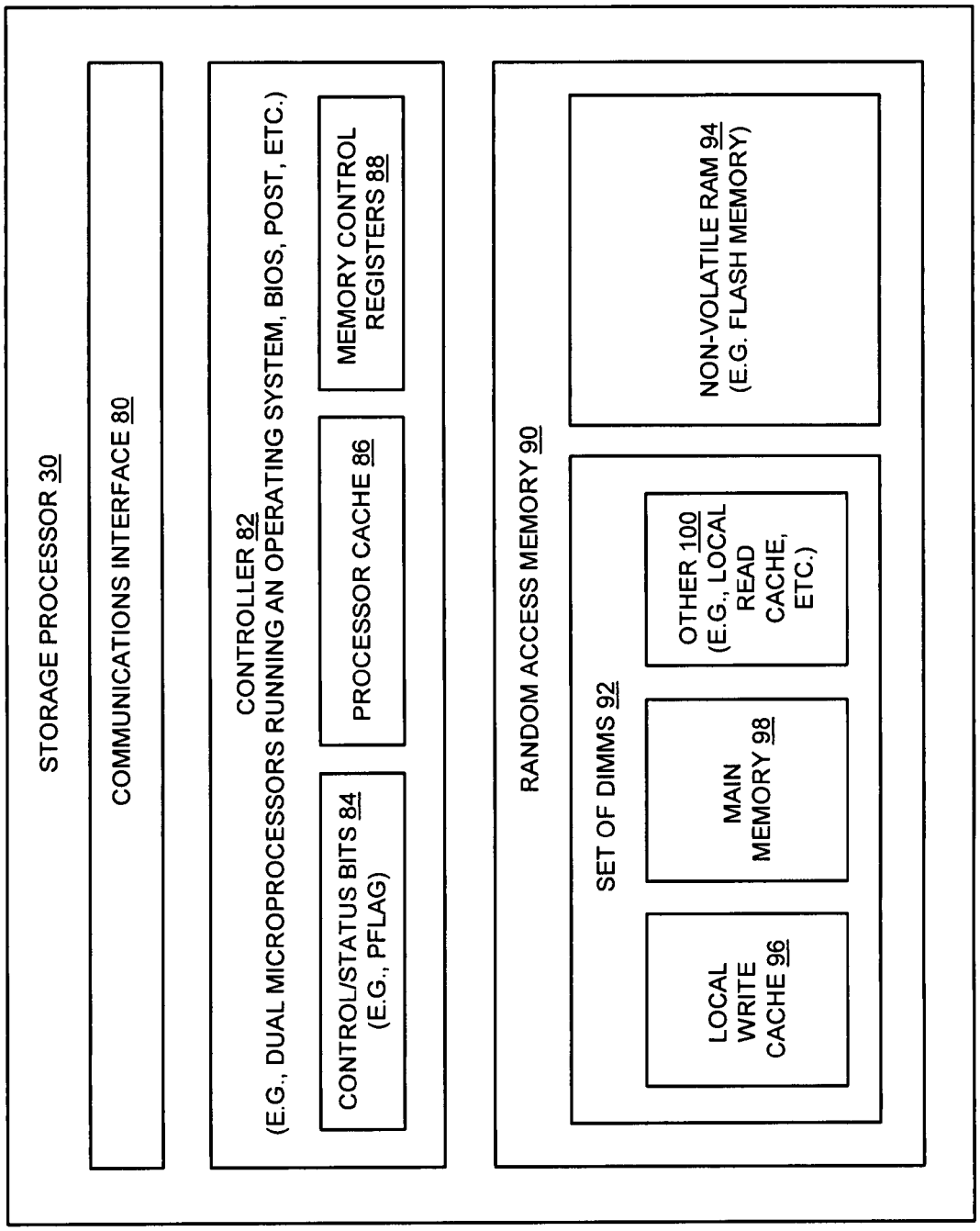
FIG. 3 is a block diagram of a storage processor of the computerized system of FIG. 1.

FIG. 3 is a block diagram of a storage processor 30 of the data storage system 20 (also see the storage processors 30(A), 30(B) in FIG. 1). As shown in FIG. 3, the storage processor 30 includes, among other things, a communications interface 80, a controller 82 and random access memory 84. In general, the communications interface 80 is configured to handle input and output (I/O) for the storage processor 30 (e.g., block based or file based communications with the external hosts 22, cache mirroring communications with the other storage processor 30, block based communications with the set of disk drives 34, etc.). The controller 82 controls operation of the storage processor 30. The random access memory (RAM) 90 stores information during operation of the controller 82.

The controller 82 is implemented as a set of processors (e.g., dual microprocessors forming the processing core) and perhaps support circuitry (e.g., FPGAs, ASICs, low-end processors, etc.) running code. In such a configuration, the controller 82 is well-suited to providing a variety of subsystems including a basic input/output system (BIOS), a power-on self-test (POST) mechanism and storage processor functions.

The controller 82 includes, among other things, control/status bits 84 (e.g., operating system parameters), a processor cache 86 (e.g., a high-speed cache in very close proximity to the processing core), and memory control registers 88. In general, the control/status bits 84 direct the operation of the controller 82 during operation. The processor cache 86 queues instructions for execution by the processing core. The memory control registers 88 control the memory state of the storage processor 30.

The random access memory 90 includes a set of dual in-line memory modules (DIMMs) 92 and non-volatile RAM 94. The DIMMs 92 are configured to hold, among other things, a local write cache 96 to store write data, and main memory 98. The DIMMs 92 are also configured to provide additional memory space 100 (e.g., space for the BIOS and POST to run, space for local read cache, space for pre-fetching operating system code, etc.).

The non-volatile RAM 94 is configured to provide non-volatile memory space which supplements disk memory (e.g., see the disk drives 34 in FIG. 1). The non-volatile RAM 92 is capable of holding the BIOS and POST code as well as a copy of the contents of the memory control registers 88 which define the memory state for the storage processor 30. The non-volatile RAM 92 is further capable of holding any additional information that would be helpful in operating and maintaining the data storage system 20 (e.g., control/status information of other subsystems for debugging purposes). Flash memory is well-suited for the non-volatile RAM 92 due to its speed, low cost and minimal resource requirements. A description of the operation of the storage processor 30 will now be provided with reference to FIGS. 4 and 5.

Figure 4:
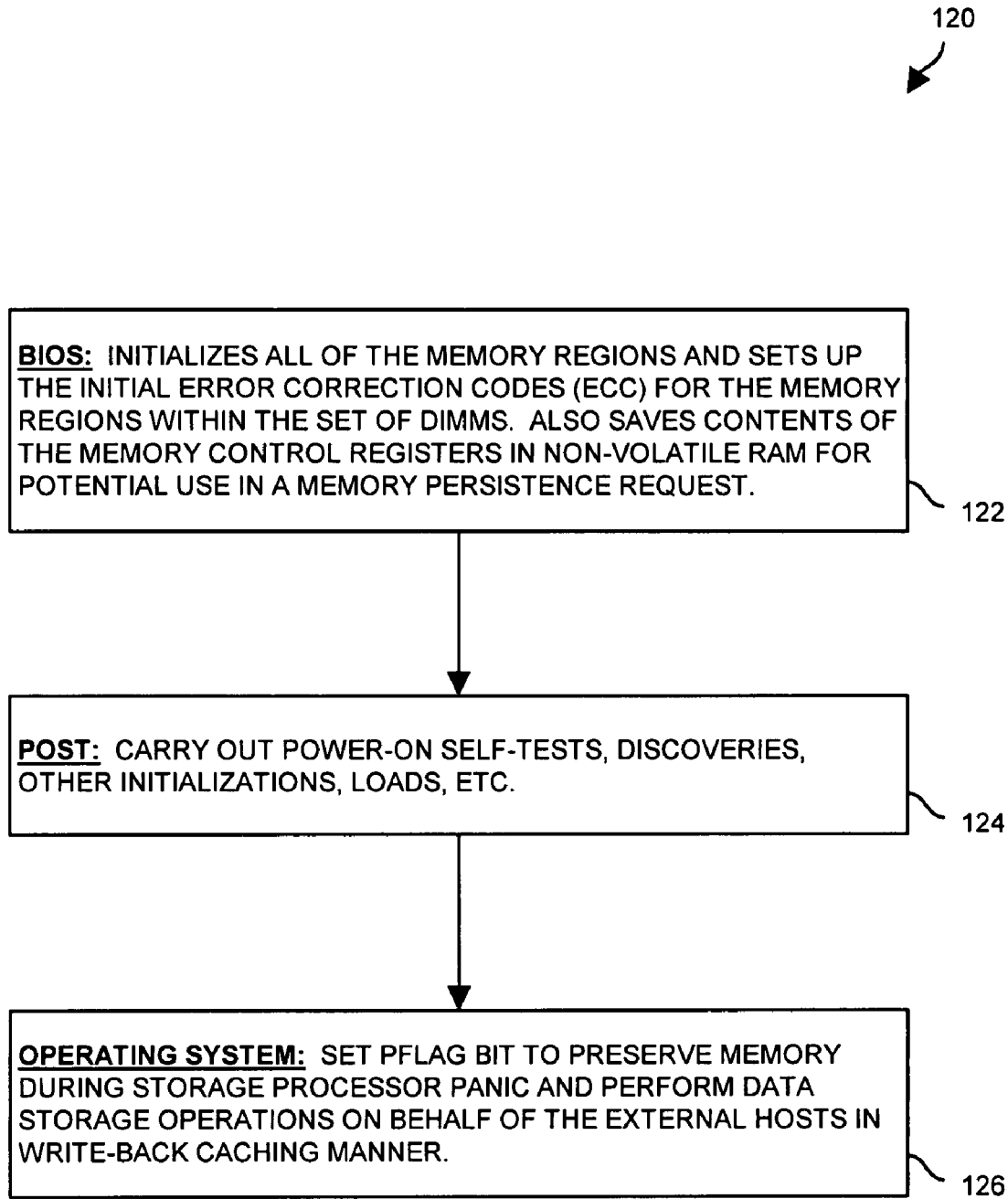
FIG. 4 is a flowchart of a procedure which is performed by the storage processor of FIG. 3 during initial power-up.

FIG. 4 is a flowchart of a procedure 120 which is performed by the controller 82 when the storage processor 30 is turned on from a powered-down state. Prior to step 122, the power supplies of the data storage system 20 turn on and provide various power supply signals to the storage processor for proper power sequencing of the microprocessors and other electronic circuits.

In step 122, the BIOS portion of the controller 82 begins execution. During BIOS operation, the BIOS initializes all of the memory regions and sets ups the initial error correction codes (ECCs) for the memory regions within the DIMMS 92. In standard fashion, the BIOS also properly configures the controller 82 so that it later loads and runs the operating system. During step 122, the BIOS saves the contents of the memory control registers 88 in the NVRAM 94 for potential use in a memory persistence request.

In step 124, the POST portion of the controller 82 utilizes a portion of the volatile semiconductor memory to carry out a series of tests, discoveries, other initializations, loads, etc. That is, the POST portion carries out power-on self-tests of various hardware components and subsystems to make sure they are working correctly before transitioning control to the operating system. The POST portion identifies whether any of the hardware components and subsystems does not pass self-test.

In step 126, the operating system loads and then performs data storage operations on behalf of the external hosts 22 (FIG. 1). A user can configure the operating system to operate in a variety of ways (e.g., write-back caching, write-through caching, etc.). In particular, the user is capable of setting a bit PFLAG to direct the storage processor 30 to preserve the contents of the DIMMS 92 (FIG. 3) in the event of a panic situation where the storage processor 30 encounters a failure and attempts to recover from that failure.

As a result of each storage processor 30 performing the procedure 120, the data storage system 20 is now running and performing data storage operations on behalf of the external hosts 22 in an active-active mode. In particular, each storage processor 30 preferably operates under a write-back caching scheme in which the storage processor 30 acknowledges completion of write operations as soon as the write data from the write operations is stored in its local write cache 96 (FIG. 3) and is mirrored on the local write cache 96 of the other storage processor 30 for high availability. Over time, the storage processors 30 synchronize the contents of the local write caches 96 to the set of disk drives 34. Further details will now be provided with reference to FIG. 5.

Figure 5:
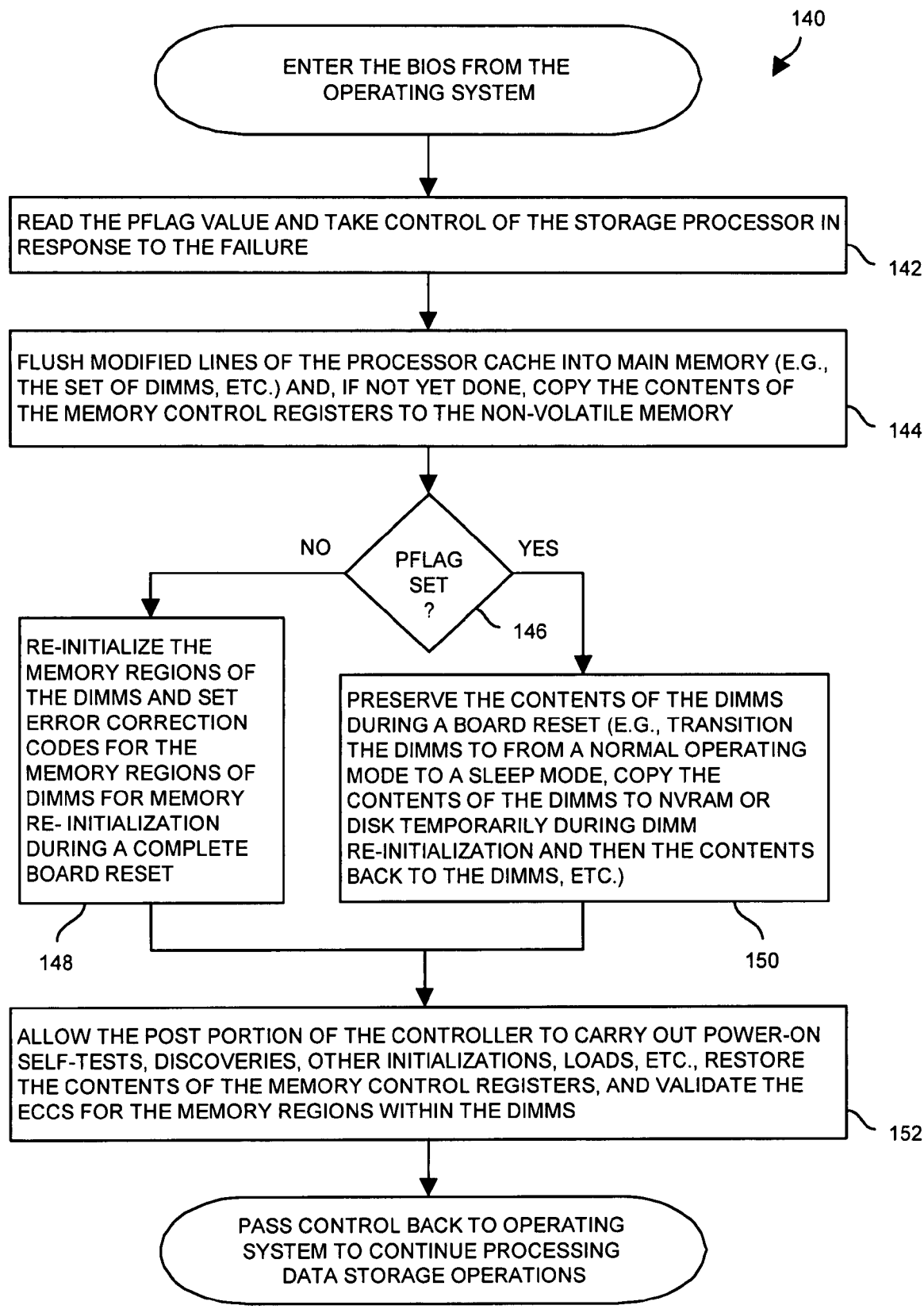
FIG. 5 is a flowchart of a procedure which is performed by the storage processor of FIG. 3 while recovering from a recoverable failure.

FIG. 5 is a flowchart of a procedure 140 which is performed by a storage processor 30 when the data storage system 20 has been configured to preserve memory while recovering from a recoverable failure. In particular, an operating system parameter PFLAG (also see the control/status bits 84 FIG. 3) has been set thus enabling the storage processor 30 to carry out write-back caching and directing the storage processor 30 to preserve the contents of the local write cache 96 (FIG. 3) during recovery.

For illustration purposes, suppose that data storage system 20 has been in stable, normal operation for a period of time. During such operation, both storage processors 30 carry out data storage operations in an active-active manner with write-back caching performed by both storage processors 30 in combination with mirroring of the local write caches 96. As a result, write data resides in multiple locations (i.e., within the local write cache 96 of each storage processor 30) before write operations are acknowledged thus providing high availability.

Next, suppose that the storage processor 30(A) suffers a failure and becomes unavailable. It should be understood that such a situation may be an extremely rare occurrence, but statistically possible and is commonly measured in terms of mean time between failure (MTBF). At this point, the storage processor 30(A) no longer performs data storage operations and mirroring of the local write caches 96 through the cache mirroring interface 32 no longer occurs. Rather, the remaining storage processor 30(B) continues to operate and process data storage operations 36 from the external hosts 22. In connection with write operations, the remaining storage processor 30(B) continues to cache write data in a write-back caching manner in its local write cache 96. As a result, the external hosts 22 continue to enjoy write-back caching response times.

Furthermore, suppose that the remaining storage processor 30(B) suffers a failure that it can recover from. For example, the remaining storage processor 30(B) may encounter an operating system crash. As yet another example, the storage processor 30(B) may suffer a minor hardware failure in a particular non-critical component. In both situations, the storage processor 30(B) carries out the procedure 140 in an attempt to continue operations.

In step 142, the operating system relinquishes control to the BIOS upon failure (e.g., by performing a processor init). After the operating system has given control to the BIOS, the BIOS reads the value of the PFLAG parameter of the operating system and takes over control. Recall that the PFLAG parameter is part of the control/status bits 84 (also see FIG. 3).

In step 144, the BIOS writes the modified lines of the processor cache 86 back to their actual locations in main memory 98, e.g., the BIOS causes all modified contents of the caches to be flushed back to memory. Such flushing of the processor cache 86 enables the system 20 to restart essentially from scratch (e.g., with the board being reset and the processors being completely reinitialized) but with the contents of the memory subsystem preserved. Additionally, if the contents of the memory control registers have not yet been copied to the non-volatile RAM 94, the BIOS copies the contents of the memory control registers 88 into the non-volatile RAM 94.

In step 146, the BIOS determines whether the PFLAG parameter has been set. If the value of the PFLAG parameter is unasserted, the BIOS proceeds to step 148 since memory preservation is deemed to be unnecessary. However, if the value of the PFLAG parameter is asserted, the BIOS proceeds to step 150.

In step 148, the BIOS re-initializes the memory regions of the DIMMS 92 and resets the ECC for the memory regions during a complete board reset. This is carried out when the PFLAG parameter was unasserted and when the contents of the local write cache 96 do not need to be preserved, e.g., during system testing. Concurrently, other circuits within the storage processor 30(B) reset (e.g., a board reset) in order to re-initialize the system 20. Step 148 then proceeds to step 152.

In step 150, memory preservation is deemed necessary and the BIOS does not re-initialize the memory regions of the DIMMS 92 and does not reset the ECC for the memory regions during a board reset. Rather, during the board reset, the BIOS preserves the contents of the DIMMS 92 including the contents of the local write cache 96 and main memory 98. In one arrangement, the BIOS directs the DIMMS 92 to transition from a normal mode of operation into a sleep mode of operation (e.g., an S3 sleep mode) to persist the write data during recovery of the storage processor 30(B) from the failure (e.g., a full board reset). Upon recovery of the storage processor 30(B) after other circuitry has re-initialized (e.g., microprocessors, I/O buffers, registers, etc.), the BIOS transitions the DIMMS 92 from the sleep mode back to the normal mode of operation. Step 150 then proceeds to step 152.

In step 152, the BIOS allows the POST carry out power-on self-tests, discoveries, other initializations that do not affect the DIMMs 92, loads, etc. At this point, the BIOS copies the contents of the memory control registers from the non-volatile RAM 94 back into the memory control registers 88 thus recovering the memory state. The BIOS also validates the ECCs of the memory regions within the DIMMs 92. If the BIOS detects an error during ECC validation, the BIOS logs the error/status/etc. in a designated location in the non-volatile RAM 94 and turns over control to an error handling routine.

The storage processor 30(B) is now ready to resume attending to data storage operations on behalf of the external hosts 22. Moreover, since the write data within the local write cache 96 of the storage processor 30(B) was preserved, no write information was lost during the failure of the storage processor 30(B). Further description is provided in earlier-referenced U.S. application Ser. No. 11/529,124 which has been incorporated by reference.

As explained above, the recovery of the storage processor 30(B) is capable of occurring exclusively at the BIOS level upon receipt of control from the operating system (e.g., via a processor init). Accordingly, in order to carry out the above-described recovery, there is no modification needed to the operating system (e.g., a legacy operating system). Rather, since the operating system performs a processor init, the BIOS is able to obtain control of the system 20, and carry out re-initialization of the system 20 with the exception of the memory subsystem.

Moreover, it should be understood that the above-described techniques for preserving the contents of the memory subsystem are capable of being used in the context of a data storage system 20 having a single storage processor 30 or a single board. In such a single processor system, such operation still provides a performance advantage over conventional data storage systems. In particular, in a single processor system, the controller 82 (FIG. 3) is capable of preserving the data in the random access memory 90 while reinitializing other storage processor components including the communications interface 80 and the control circuitry itself in response to a failure. Accordingly, the above-described persisting of memory applies to systems having 1 through M storage processors 30 (M being any positive integer greater than 1).

As described above, a computerized system 20 has multiple storage processors 30 which are constructed and arranged to preserve write data in respective local write caches 96 in response to failures to the extend possible. With the ability to preserve write data in a local write cache 96, a remaining storage processor 30(B) is capable of (i) carrying out a write-back caching scheme after the loss of a first storage processor 30(A) and (ii) recovering from its own failure without losing any write data. As a result, the storage processor 30(B) enjoys write-back caching performance even after recovery of the storage processor 30(B). Moreover, the statistical odds of the storage processor 30(B) succumbing to a failure that it cannot recover from (i.e., in which the write data in its local write cache would be truly lost) after loss of the other storage processor 30(A) are astronomically low and thus offer an acceptable risk in many situations.

While various embodiments of the invention have been particularly shown and described, it will be understood by those skilled in the art that various changes in form and details may be made therein without departing from the spirit and scope of the invention as defined by the appended claims.

For example, the storage processors 30 were described above as being constructed and arranged to utilize a sleep feature of the DIMMs 92 to persist data during recovery. In some arrangements, the DIMMs 92 are laptop-style memory devices which are designed for power-conservation in a laptop computer. For the use of such DIMMs in the data storage system 20, the controller 82 places the DIMMs 92 into a sleep mode of operation (e.g., an S3 sleep mode) in which the DIMMs enter refresh states in which each module periodically refreshes its contents thus preserving data.

Additionally, it should be understood that there are other techniques which are suitable to preserving information while the storage processor 30 recovers (e.g., see step 150 in FIG. 5). In some arrangements, the BIOS preserves the write data (and the processor cache contents if necessary) by copying the stored information from the DIMMS 92 to another location such as the non-volatile RAM 94 or out to the disk drives 34. The BIOS then re-initializes the memory regions of the DIMMS 92 and resets their ECCs concurrently with resetting and re-initialization of other data storage components (e.g., a circuit board reset, microprocessor resets, etc.). After re-initialization of the DIMMs 92 is complete, the BIOS restores the copied information from the other location back into the DIMMs 92 so that the information has been effectively preserved.

Furthermore, it should be understood that the data storage system 20 was described above as utilizing a set of disk drive 34 by way of example only. In other arrangements, the data storage system 20 utilizes other types of storage devices such as semiconductor-based storage units, magnetic tape units, CDROMs, and the like, combinations thereof, etc. Further modifications and enhancements are intended to belong to various embodiments of the invention.

What is claimed is:

1. In a computerized system having a first storage processor and a second storage processor, the first and second storage processors having respective local write caches configured to mirror each other, a method for recovering from a storage processor failure, the method comprising:
   when the first storage processor becomes unavailable and mirroring of the local write caches is prevented, continuing to attend to write operations from an external host in a write-back manner by caching write data from the write operations in the local write cache of the second storage processor while the first storage processor remains unavailable;
   in response to a failure of the second storage processor, preserving the write data in the local write cache of the second storage processor; and
   upon recovery of the second storage processor from the failure, continuing to attend to further write operations from the external host in the write-back manner by caching additional write data from the further write operations in the local write cache of the second storage processor while the first storage processor remains unavailable.

2. A method as in claim 1 wherein a set of dual in-line memory modules holds the local write cache of the second storage processor; and
   wherein preserving the write data in the local write cache of the second storage processor in response to the failure of the second storage processor includes transitioning the set of dual in-line memory modules from a normal mode of operation into a sleep mode of operation to persist the write data during recovery of the second storage processor from the failure.

3. A method as in claim 2 wherein the set of dual in-line memory modules further holds main memory;
wherein the second storage processor includes a processor cache to queue instructions carried out by the second storage processor; and
wherein the method further comprises:
flushing modified lines of the processor cache to the main memory in response to the failure of the second storage processor.

4. A method as in claim 3 wherein the second storage processor includes memory control registers which identify a state of memory within the second storage processor; and wherein the method further comprises:
storing a copy of the contents of the memory control registers in non-volatile random access memory in response to the failure of the second storage processor.

5. A method as in claim 4, further comprising:
prior to continuing to attend to further write operations from the external host, moving the copy of the contents of the memory control registers from the non-volatile random access memory into the memory control registers.

6. A method as in claim 5, further comprising:
transitioning the set of dual in-line memory modules from the sleep mode of operation back to the normal mode of operation; and
performing an error correction code validation process on the persisted write data, the second storage processor being allowed to attend to the further write operations from the external host only when the error correction code validation process validates the persisted write data.

7. A method as in claim 5, further comprising:
prior to attending to any write operations from the external host and in response to an initial power-up situation, enabling a basic input/output system (BIOS) of the second storage processor to initialize all memory regions within the set of dual in-line memory modules to set error correction codes for all of the memory regions.

8. A method as in claim 5 wherein (i) flushing modified lines of the processor cache into main memory and (ii) storing the copy of the contents of the memory control registers in the non-volatile random access memory are carried out by the BIOS of the second storage processor.

9. A method as in claim 8 wherein an operating system runs on the second storage process; and wherein the method further comprises:
prior to attending to the write operations from the external host, having the operating system set a PFLAG bit configured to direct the BIOS of the second storage processor to transition the set of dual in-line memory modules holding the write cache from the normal mode of operation into the sleep mode of operation in the event of a second storage processor failure.

10. A method as in claim 1 wherein the second storage processor includes (i) volatile memory which holds the local write cache of the second storage processor and (ii) non-volatile memory; and
wherein preserving the write data in the local write cache of the second storage processor in response to the failure of the second storage processor includes copying the contents of the local write cache from the volatile memory to the non-volatile memory prior to re-initialization of the volatile memory, and then from non-volatile memory back to the volatile memory after re-initialization of the volatile memory to maintain the contents of the local write cache during recovery of the second storage processor.

11. A computerized system, comprising:
a first storage processor; and
a second storage processor, each of the first and second storage processors having a local write cache; and
an interface through which the local writes caches of the first and second storage processors mirror each other;
the second storage processor being constructed and arranged to:
when the first storage processor becomes unavailable and mirroring of the local write caches is prevented, continue to attend to write operations from an external host in a write-back manner by caching write data from the write operations in the local write cache of the second storage processor while the first storage processor remains unavailable,
in response to a failure of the second storage processor, preserve the write data in the local write cache of the second storage processor, and
upon recovery of the second storage processor from the failure, continue to attend to further write operations from the external host in the write-back manner by caching additional write data from the further write operations in the local write cache of the second storage processor while the first storage processor remains unavailable.

12. A computerized system as in claim 11 wherein a set of dual in-line memory modules holds the local write cache of the second storage processor; and
wherein the second storage processor, when preserving the write data in the local write cache of the second storage processor in response to the failure of the second storage processor, is constructed and arranged to transition the set of dual in-line memory modules from a normal mode of operation into a sleep mode of operation to persist the write data during recovery of the second storage processor from the failure.

13. A computerized system as in claim 12 wherein the set of dual in-line memory modules further holds main memory;
wherein the second storage processor includes a processor cache to queue instructions carried out by the second storage processor; and
wherein the second storage processor is further constructed and arranged to flush modified lines of the processor cache into the main memory in response to the failure of the second storage processor.

14. A computerized system as in claim 13 wherein the second storage processor includes memory control registers which identify a state of memory within the second storage processor; and wherein the second storage processor is further constructed and arranged to:
store a copy of the contents of the memory control registers in non-volatile random access memory in response to the failure of the second storage processor.

15. A computerized system as in claim 14 wherein the second storage processor is further constructed and arranged to:
prior to continuing to attend to further write operations from the external host, move the copy of the contents of the memory control registers from the non-volatile random access memory into the memory control registers.

16. A computerized system as in claim 15 wherein the second storage processor is further constructed and arranged to:
- transition the set of dual in-line memory modules from the sleep mode of operation back to the normal mode of operation; and
- performing an error correction code validation process on the persisted write data, the second storage processor being allowed to attend to the further write operations from the external host only when the error correction code validation process validates the persisted write data.

17. A computerized system as in claim 15 wherein the second storage processor includes a basic input/output system (BIOS) which is constructed and arranged to initialize all memory regions within the set of dual in-line memory modules to set error correction codes for all of the memory regions in response to an initial power-up situation and prior to the second storage processor attending to any write operations from the external host.

18. A computerized system as in claim 15 wherein (i) flushing the modified lines of the processor cache into the main memory and (ii) storing the copy of the contents of the memory control registers in the non-volatile random access memory are carried out by the BIOS of the second storage processor.

19. A computerized system as in claim 18 wherein an operating system runs on the second storage process; and wherein the second storage processor is further constructed and arranged to:
- prior to attending to the write operations from the external host, having the operating system set a PFLAG bit configured to direct the BIOS of the second storage processor to transition the set of dual in-line memory modules holding the write cache from the normal mode of operation into the sleep mode of operation in the event of a second storage processor failure.

20. A computerized system as in claim 11 wherein the second storage processor includes (i) volatile memory which holds the local write cache of the second storage processor and (ii) non-volatile memory; and
wherein the second storage processor, when preserving the write data in the local write cache of the second storage processor in response to the failure of the second storage processor, is constructed and arranged to copy the contents of the local write cache from the volatile memory to the non-volatile memory prior to re-initialization of the volatile memory, and then from non-volatile memory back to the volatile memory after re-initialization of the volatile memory to maintain the contents of the local write cache during recovery of the second storage processor.

21. A processing device, comprising:
- a communications interface constructed and arranged to communicate with a set of storage devices;
- random access memory constructed and arranged to cache data en route to the set of storage devices; and
- control circuitry coupled to the communications interface and to the random access memory, the control circuitry being constructed and arranged to preserve the data in the random access memory while reinitializing other storage processor components including the communications interface and the control circuitry in response to a failure.

22. A method as in claim 1:
wherein the second storage processor includes memory control registers which identify a state of memory within the second storage processor; and
wherein the method further comprises, storing a copy of the contents of the memory control registers in non-volatile random access memory in response to the failure of the second storage processor.

23. A method as in claim 1:
wherein the method further comprises, during power up of the second storage processor, running a basic input/output system (BIOS) and a power-on self-test (POST) on the second storage processor; and
wherein preserving the write data in the local write cache of the second storage processor includes, preventing the write data in the local write cache of the second storage processor from being overwritten by the BIOS and the POST during power up of the second storage processor.

24. A computerized system as in claim 11:
wherein the second storage processor includes memory control registers which identify a state of memory within the second storage processor; and
wherein the second storage processor is further constructed and arranged to store a copy of the contents of the memory control registers in non-volatile random access memory in response to the failure of the second storage processor.

25. A computerized system as in claim 11:
wherein the second storage processor is constructed and arranged to, during power up of the second storage processor, run a basic input/output system (BIOS) and a power-on self-test (POST); and
wherein preserving the write data in the local write cache of the second storage processor includes, preventing the write data in the local write cache of the second storage processor from being overwritten by the BIOS and the POST during power up of the second storage processor.

26. A processing device as in claim 21:
wherein the control circuitry includes memory control registers which identify a state of memory within the processing device; and
wherein the control circuitry is further constructed and arranged to store a copy of the contents of the memory control registers in non-volatile random access memory in response to the failure.

27. A processing device as in claim 21:
wherein the control circuitry is constructed and arranged to, during power up of the processing device, run a basic input/output system (BIOS) and a power-on self-test (POST); and
wherein being constructed and arranged to preserve the data in the random access memory includes, preventing the data in the random access memory from being overwritten by the BIOS and the POST during power up of the processing device.

* * * * *